(12) United States Patent
Kosaka

(10) Patent No.: US 8,471,935 B2  
(45) Date of Patent: Jun. 25, 2013

(54) IMAGING APPARATUS HAVING AN IMAGE CORRECTION FUNCTION AND METHOD FOR CONTROLLING THE SAME

(75) Inventor: Takashi Kosaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/568,647

(22) Filed: Sep. 28, 2009

(65) Prior Publication Data

US 2010/0079617 A1    Apr. 1, 2010

(30) Foreign Application Priority Data

Sep. 29, 2008  (JP) ................................. 2008-251687
Aug. 10, 2009  (JP) ................................. 2009-186155

(51) Int. Cl.
*H04N 5/20*    (2006.01)

(52) U.S. Cl.
USPC .......................................... 348/255; 348/251

(58) Field of Classification Search
USPC ................ 348/207.99, 208.99, 221.1, 222.1, 348/255, 362–368, 229.1, 251; 396/153, 396/213–262; 382/274, 270–273; 358/461, 358/446, 521; 250/214 AG
See application file for complete search history.

(56) References Cited

U.S. PATENT DOCUMENTS

| | | | |
|---|---|---|---|
| 2004/0081369 A1* | 4/2004 | Gindele et al. | 382/274 |
| 2004/0160525 A1* | 8/2004 | Kingetsu et al. | 348/364 |
| 2005/0206750 A1 | 9/2005 | Aoyagi | |
| 2005/0206966 A1* | 9/2005 | Kakumitsu | 358/461 |
| 2007/0195172 A1* | 8/2007 | Kurata | 348/208.99 |
| 2007/0206941 A1* | 9/2007 | Maruyama et al. | 396/153 |
| 2007/0274702 A1* | 11/2007 | Wakabayashi | 396/246 |

FOREIGN PATENT DOCUMENTS

| | | | |
|---|---|---|---|
| JP | 2005-223511 A | 8/2005 | |
| JP | 2005-292740 A | 10/2005 | |
| JP | 2005292740 A | * 10/2005 | |

OTHER PUBLICATIONS

Canon Inc., Canon EOS 40D Digital Instruction Manual, Aug. 2007.*

* cited by examiner

*Primary Examiner* — Nelson D. Hernández Hernández
*Assistant Examiner* — Dennis Hogue
(74) *Attorney, Agent, or Firm* — Canon USA, Inc., IP Division

(57) ABSTRACT

An imaging apparatus includes an image sensor configured to capture an object image, a selection unit configured to automatically select a sensitivity of the image sensor from a predetermined selectable range, and an image processing unit configured to execute correction processing in which a signal of an image captured by the image sensor which has the sensitivity selected by the selection unit is amplified. When the image processing unit is set to execute the correction processing, the selection unit sets an upper limit of the selectable range lower, compared with the upper limit thereof when the image processing unit is not set to execute the correction processing.

8 Claims, 7 Drawing Sheets

EXAMPLE OF WHEN CHANGING ISO SELECTABLE RANGE AND STANDARD ISO

| | IMAGE CORRECTION DISABLED | IMAGE CORRECTION ENABLED |
|---|---|---|
| AUTOMATIC ISO RANGE | 100~800 | 100~400 |
| STANDARD ISO | 200 | 100 |

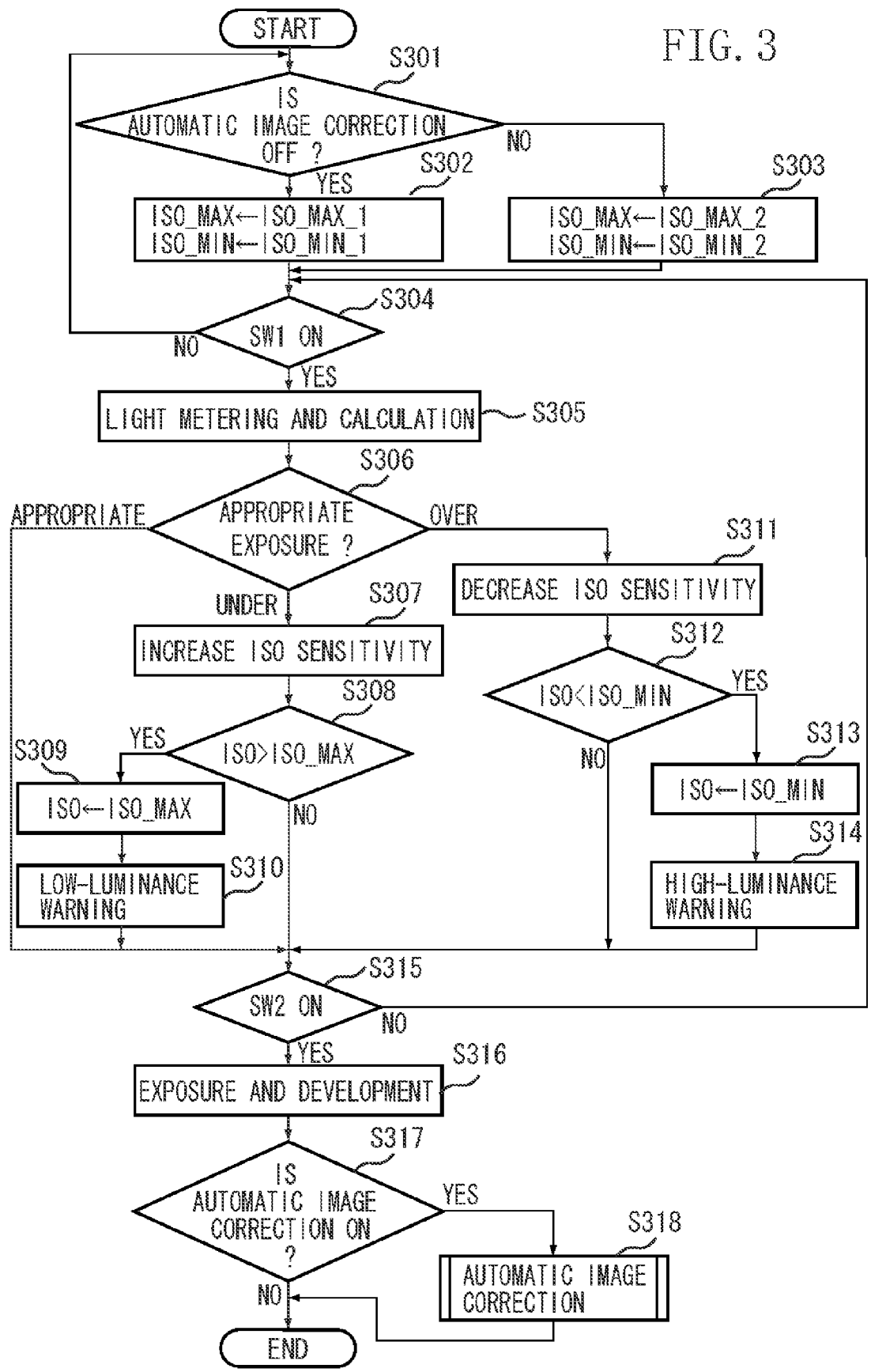

FIG. 4A

EXAMPLE OF WHEN CHANGING ISO SELECTABLE RANGE

|  | IMAGE CORRECTION DISABLED | IMAGE CORRECTION ENABLED |
|---|---|---|
| AUTOMATIC ISO RANGE | 200~800 | 100~400 |
| STANDARD ISO | 100 | 100 |

FIG. 4B

EXAMPLE OF WHEN CHANGING STANDARD ISO

|  | IMAGE CORRECTION DISABLED | IMAGE CORRECTION ENABLED |
|---|---|---|
| AUTOMATIC ISO RANGE | 100~800 | 100~800 |
| STANDARD ISO | 200 | 100 |

FIG. 4C

EXAMPLE OF WHEN CHANGING ISO SELECTABLE RANGE AND STANDARD ISO

|  | IMAGE CORRECTION DISABLED | IMAGE CORRECTION ENABLED |
|---|---|---|
| AUTOMATIC ISO RANGE | 100~800 | 100~400 |
| STANDARD ISO | 200 | 100 |

IMAGING APPARATUS HAVING AN IMAGE CORRECTION FUNCTION AND METHOD FOR CONTROLLING THE SAME

BACKGROUND OF THE INVENTION

1. Field of the Invention

The present invention relates to a photography technique using an automatic image correction function.

2. Description of the Related Art

An imaging apparatus is conventionally equipped with an exposure control unit for determining exposure parameters to capture an image with suitable brightness when the image is captured. To obtain an appropriate exposure, the exposure control unit determines a combination of the exposure parameters, such as a shutter speed (or a charge accumulation time), an aperture value, and an International Organization for Standardization (ISO) sensitivity, based on light metering results before capturing an image. However, for example, when an image is captured against the sun or when a highly reflective object is included in an image, a user cannot always find the captured image satisfactory. Further, when an interchangeable-lens system is used, decrease in marginal illumination is caused depending on characteristics of an attached lens, and corners of the captured image is darkened.

Japanese Patent Application Laid-Open No. 2005-223511 discusses a technique for obtaining image data with appropriate brightness. According to the technique, an image is captured with exposure parameters determined by light metering results and image correction processing is then executed on the image data.

Since an ISO sensitivity of film cameras is determined by a film to be used, a combination of the shutter speed and the aperture value is used as the exposure parameters. In contrast, in the case of digital cameras, the ISO sensitivity is also changeable. Recently, an automatic ISO sensitivity setting mode, in which the sensitivity is automatically set, has been installed in digital cameras in addition to a manual sensitivity setting mode set by a user. Therefore, for digital cameras, in addition to the shutter speed and the aperture value, the ISO sensitivity can also be set as an exposure parameter. For example, Japanese Patent Application Laid-Open No. 2005-292740 discusses a digital camera which can prevent camera shake by automatically increasing the ISO sensitivity in a low luminance environment and controlling the shutter speed not to decrease.

However, when an image is captured with a high ISO sensitivity, noise in the image tends to increase. Thus, to prevent a signal-to-noise ratio (SNR) of an image from falling below a predetermined level, an upper limit in a selectable range of an ISO sensitivity is generally determined in an automatic ISO sensitivity setting mode, compared with the upper limit in a selectable range of the ISO sensitivity in a manual ISO sensitivity setting mode.

For example, while the ISO sensitivity can be set in the range of 100 to 1600 in the manual ISO sensitivity setting mode by the user, the ISO sensitivity can be set in the range of 100 to 800 in the automatic ISO sensitivity setting mode. In this case, it is assumed that a captured image satisfies a predetermined SNR level with the ISO sensitivity 800. However, if the above image correction processing amplifies a signal to increase luminance of image data, when the image correction processing is executed on the captured image, noise is accordingly amplified further, and the SNR may be deteriorated.

SUMMARY OF THE INVENTION

According to an aspect of the present invention, an imaging apparatus includes an image sensor configured to capture an object image, a selection unit configured to automatically select a sensitivity of the image sensor from a predetermined selectable range, and an image processing unit configured to execute correction processing in which a signal of an image captured by the image sensor which has the sensitivity selected by the selection unit is amplified, wherein, when the image processing unit is set to execute the correction processing, the selection unit sets an upper limit of the selectable range lower, compared with the upper limit thereof when the image processing unit is not set to execute the correction processing.

According to another aspect of the present invention, an imaging apparatus includes an image sensor configured to capture an object image, a selection unit configured to automatically select a sensitivity of the image sensor from a predetermined selectable range, and an image processing unit configured to execute correction processing in which a signal of an image captured by the image sensor which has the sensitivity selected by the selection unit is amplified, wherein, when the image processing unit is set to execute the correction processing, the selection unit sets a standard sensitivity to be preferentially selected within the selectable range lower, compared with the standard sensitivity when the image processing unit is not set to execute the correction processing.

According to yet another aspect of the present invention, an imaging apparatus includes an image sensor configured to capture an object image, a selection unit configured to automatically select a sensitivity of the image sensor from a first selectable range, an image processing unit configured to execute correction processing in which a signal of an image captured by the image sensor which has the sensitivity selected by the selection unit is amplified, and a warning unit configured to issue a warning when the image processing unit is set to execute the correction processing and the sensitivity selected by the selection unit exceeds an upper limit of a second selectable range, which is set lower than an upper limit of the first selectable range.

According to yet another aspect of the present invention, a method for capturing an image includes automatically selecting a sensitivity of an image sensor configured to capture an object image from a predetermined selectable range, and executing correction processing in which a signal of an image captured by the image sensor which has the selected sensitivity is amplified, wherein, when the selection is made and the correction processing is set to be executed, an upper limit of the selectable range is set lower, compared with the upper limit thereof when the correction processing is not set to be executed.

According to yet another aspect of the present invention, a method for capturing an image includes automatically selecting a sensitivity of an image sensor configured to capture an object image from a predetermined selectable range, and executing correction processing in which a signal of an image captured by the image sensor which has the selected sensitivity is amplified, wherein, when the selection is made and the correction processing is set to be executed, a standard sensitivity to be preferentially selected within the selectable range is set lower, compared with the standard sensitivity when the correction processing is not set to be executed.

According to yet another aspect of the present invention, a method for capturing an image includes automatically selecting a sensitivity of an image sensor configured to capture an object image from a first selectable range, executing correction processing in which a signal of an image captured by the image sensor which has the selected sensitivity is amplified, and giving a warning when the correction processing is set to be executed and the selected sensitivity exceeds an upper limit of a second selectable range, the upper limit of which is set lower than an upper limit of the first selectable range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flow chart illustrating an operation in an automatic ISO sensitivity setting in the first exemplary embodiment.

FIGS. 4A to 4C illustrate the ISO selection ranges in the automatic ISO sensitivity setting in the first and second exemplary embodiments.

DESCRIPTION OF THE EMBODIMENTS

Various exemplary embodiments, features, and aspects of the invention will be described in detail below with reference to the drawings.

Figure 1:
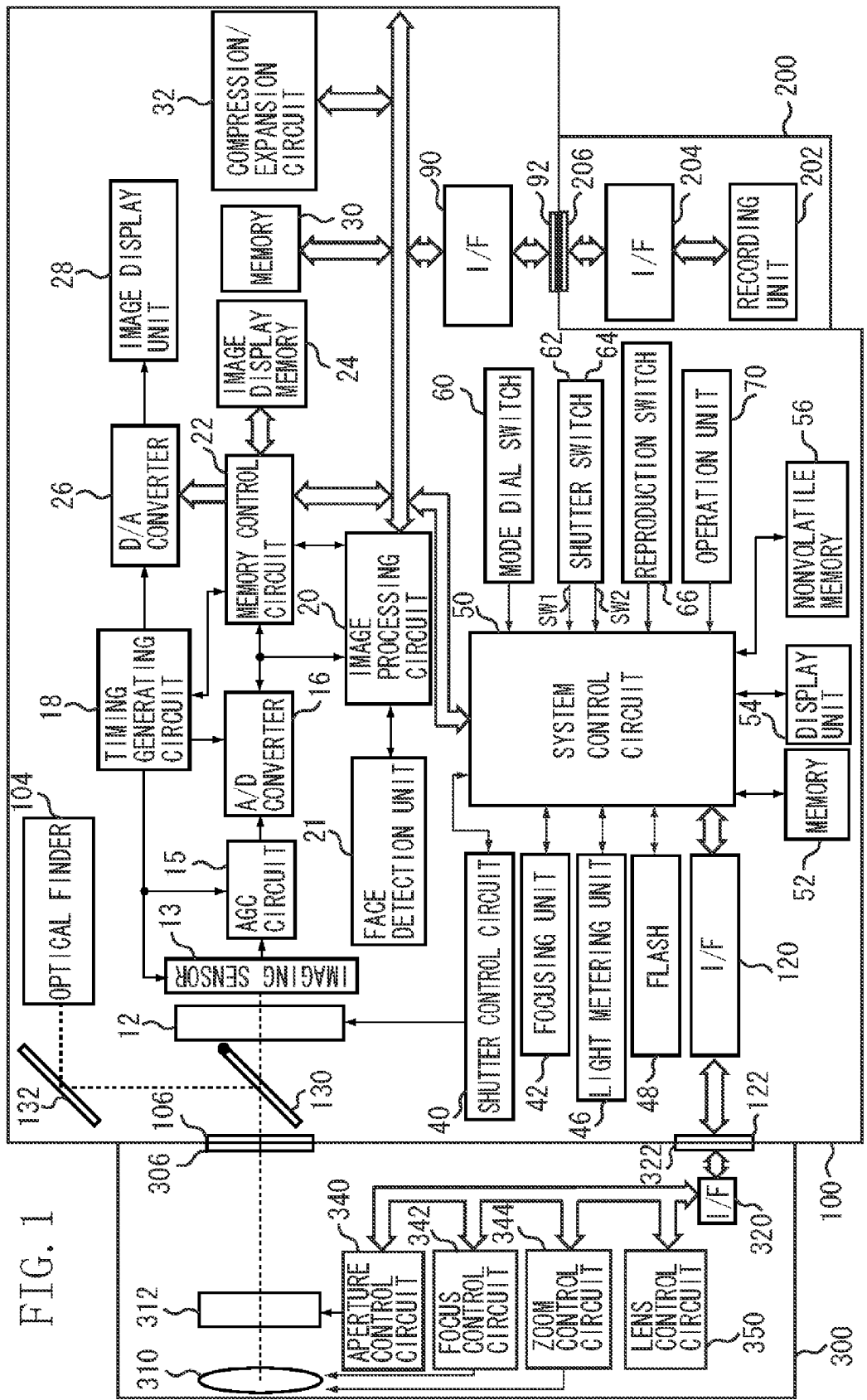
FIG. 1 is a block diagram illustrating an imaging apparatus of first and second exemplary embodiments according to the present invention.

FIG. 1 is a block diagram illustrating a structure of an imaging apparatus of an exemplary embodiment according to the present invention.

In FIG. 1, an imaging apparatus 100 is a digital camera or the like and comprises a shutter 12 for controlling an amount of exposure input to an image sensor 13. The image sensor 13 photoelectrically converting an object image includes a charge coupled device (CCD) or a complementary metal oxide semiconductor (CMOS) image sensor.

If a mirror 130 is retracted from an optical path, light entering a photographic lens 310 is allowed to pass through an aperture 312, lens mounts 306 and 106, and the shutter 12 based on a single-lens reflex camera system. The light is then focused as an optical image on the image sensor 13.

Prior to analog-to-digital (A/D) conversion, an automatic gain control (AGC) circuit 15 controls a gain of an analog signal to control an image signal level. The AGC circuit 15 executes the gain control based on a selected ISO sensitivity. The AGC circuit 15 executes the gain control to control a sensitivity of the image sensor 13.

An A/D converter 16 converts an analog signal output from the AGC circuit 15 to a digital signal.

A timing generation circuit 18 supplies a clock signal or a control signal to the image sensor 13, the AGC circuit 15, the A/D converter 16, and a digital-to-analog (D/A) converter 26 and is controlled by a memory control circuit 22 and a system control circuit 50.

An image processing circuit 20 executes predetermined pixel interpolation processing or color conversion processing on data supplied from the A/D converter 16 or from the memory control circuit 22. The image processing circuit 20 also executes predetermined arithmetic processing using image data concerning a captured image and executes through-the-lens (TTL) automatic white balance (AWB) processing based on the obtained calculation results. Further, the image processing circuit 20 can execute processing for level correction or gamma correction to control an exposure level of an image.

A face detection unit 21 detects a human face from the image data processed by the image processing circuit 20 and identifies a position and a size of the face based on the image data. Detection is made by extracting skin-color data from the image data and extracting an area determined to be a skin-color area as a face area, for example. Various other methods may be used to detect such face area, for example, the detection may be made by focusing on facial parts such as eyes, a nose, and a mouth. Alternatively, the detection may be made by focusing a face line and using information concerning an elliptical shape of the face line.

The memory control circuit 22 controls the A/D converter 16, the timing generation circuit 18, the image processing circuit 20, an image display memory 24, the D/A converter 26, a memory 30, and a compression/expansion circuit 32. Data output from the A/D converter 16 is written in the image display memory 24 or the memory 30 via the image processing circuit 20 and the memory control circuit 22 or via the memory control circuit 22 alone.

The imaging apparatus 100 comprises the image display memory 24, the D/A converter 26, and an image display unit 28 including a thin film transistor (TFT) or a liquid crystal display (LCD). The image data written in the image display memory 24 is sent via the D/A converter 26 to the image display unit 28 to be displayed.

The memory 30 which stores captured still images can be used as a work area for the system control circuit 50.

The compression/expansion circuit 32 which compresses and expands the image data using adaptive discrete cosine transform (ADCT) or the like reads an image stored in the memory 30, compresses or expands the image, and writes the processed data in the memory 30.

Based on light metering information sent from a light metering unit 46, a shutter control circuit 40 controls the shutter 12 in collaboration with an aperture control circuit 340 which controls the aperture 312.

Light entering the photographic lens 310 passes through the aperture 312, the lens mounts 306 and 106, the mirror 130, and a focus sub-mirror (not shown), and the light then forms an image as an optical image based on a single-lens reflex camera system. A focusing unit 42 for executing automatic focusing (AF) processing measures an in-focus state of the image.

Light entering the photographic lens 310 passes through the aperture 312, the lens mounts 306 and 106, the mirrors 130 and 132, and a light metering lens (not shown). The light then forms the image as the optical image based on the single-lens reflex camera system. The light metering unit 46 for executing automatic exposure (AE) processing measures an exposure state of the image. Further, functioning along with a flash 48, the light metering unit 46 has a flash light amount control function. The flash 48 has a function of not only illuminating an object but also projecting AF auxiliary light for capturing a still image.

The system control circuit 50 controls the entire imaging apparatus 100, and a memory 52 stores various data including constants, variables, and programs to operate the system control circuit 50.

A display unit 54 includes a speaker and a liquid crystal display that displays an operation state or a message with characters, images, and sound in response to a program executed by the system control circuit 50. The display unit 54 is located at a single place or a plurality of places easily visible for a user near the operation unit 70 of the imaging apparatus 100. The display unit 54 includes a combination of an LCD, a light-emitting diode (LED), and a sound production element, for example. Also, a part of the functions of the display unit 54 is located in an optical finder 104. For example, the display unit 54 displays, on the LCD thereof, a shutter speed, aperture value, information concerning exposure correction, or information concerning light-amount correction.

A nonvolatile memory 56 is electrically deletable and recordable, and an electrically erasable and programmable read only memory (EEPROM) or the like is used.

Operation devices 60, 62, 64, 66, and 70 are used to input instructions for various operations of the system control circuit 50. Each of the operation devices includes a single element such as a switch or a dial or a combination of a plurality of such elements.

These operation devices will be described in detail below.

A mode dial switch 60 is used to select an appropriate mode from various modes including an automatic photographing mode, a shutter speed priority photographing mode, an aperture priority photographing mode, a manual photographing mode, a portrait photographing mode, and a sports photographing mode.

When a shutter button (not shown) is pressed halfway, a shutter switch SW1 62 turns on and issues an instruction to start the AF or AE processing.

When the shutter button (not shown) is pressed completely, a shutter switch SW2 64 turns on and issues an instruction to start a series of image processing, such as flash light amount control processing, exposure processing, development processing, and recording processing. In the flash light amount control processing, prior to the exposure processing, the flash 48 is caused to emit preliminary light, and based on an amount of light reflected from the object, an amount of light emitted from the flash 48 during the exposure processing is calculated. In the exposure processing, a level of a signal read from the image sensor 13 is adjusted by the AGC circuit 15, and the image data is written in the memory 30 via the A/D converter 16 and the memory control circuit 22. The development processing includes calculation by the image processing circuit 20 or the memory control circuit 22. In the recording processing, the image data is read from the memory 30, compressed by the compression/expansion circuit 32, and written in the recording unit 200.

A reproduction switch 66 issues an instruction to start a reproduction operation in which a captured image is read from the memory 30 or the recording unit, and is displayed on the image display unit 28.

The operation unit 70 comprises various buttons and a touch panel, such as a menu button, a set button, an ISO sensitivity selection button, and a dial for selecting various settings. An interface 90 connects the imaging apparatus 100 to the recording unit 200 such as a memory card or a hard disk via a connector 92.

In the lens mount 106, an interface 120 connects the imaging apparatus 100 to the lens unit 300. A connector 122 electrically connects the imaging apparatus 100 to the lens unit 300.

The connector 122 transmits various signals such as a control signal, a state signal, and a data signal between the imaging apparatus 100 and the lens unit 300.

The mirrors 130 and 132 can guide light that has entered the photographic lens 310 to the optical finder 104 based on the single-lens reflex camera system. The mirror 132 may be a quick-return mirror or a half mirror.

The recording unit 200 may be a memory card or a hard disk, for example. The recording unit 200 comprises a recording unit 202 which includes a semiconductor memory, a magnetic disk, or the like, an interface 204 connected to the imaging apparatus 100, and a connector 206 which connects the recording unit 200 to the imaging apparatus 100.

The lens unit 300 is of an interchangeable lens type.

The lens mount 306 mechanically couples the lens unit 300 with the imaging apparatus 100. The lens mount 306 includes various functions for electrically connecting the lens unit 300 to the imaging apparatus 100.

The lens unit 300 includes the photographic lens 310 and the aperture 312.

In the lens mount 306, an interface 320 connects the lens unit 300 to the imaging apparatus 100. A connector 322 electrically connects the lens unit 300 to the imaging apparatus 100. The connector 322 transmits various signals such as a control signal, a state signal, and a data signal between the imaging apparatus 100 and the lens unit 300.

Based on light metering information sent from the light metering unit 46, the aperture control circuit 340 controls the aperture 312 in collaboration with the shutter control circuit 40 which controls the shutter 12.

A focus control circuit 342 controls focusing of the photographic lens 310, and a zoom control circuit 344 controls zooming of the photographic lens 310.

A lens system control circuit 350 controls the entire lens unit 300. The lens system control circuit 350 functions as a memory for storing various data including constants, variables, and programs for various operations. The lens system control circuit 350 further functions as a nonvolatile memory for storing identification information such as lens-unit-specific numbers, management information, function information such as a full-aperture value, a minimum aperture value, and a focal length, and current and past setting values.

Next, an operation of the automatic ISO sensitivity setting according to a first exemplary embodiment of the present invention will be described.

Figure 2:
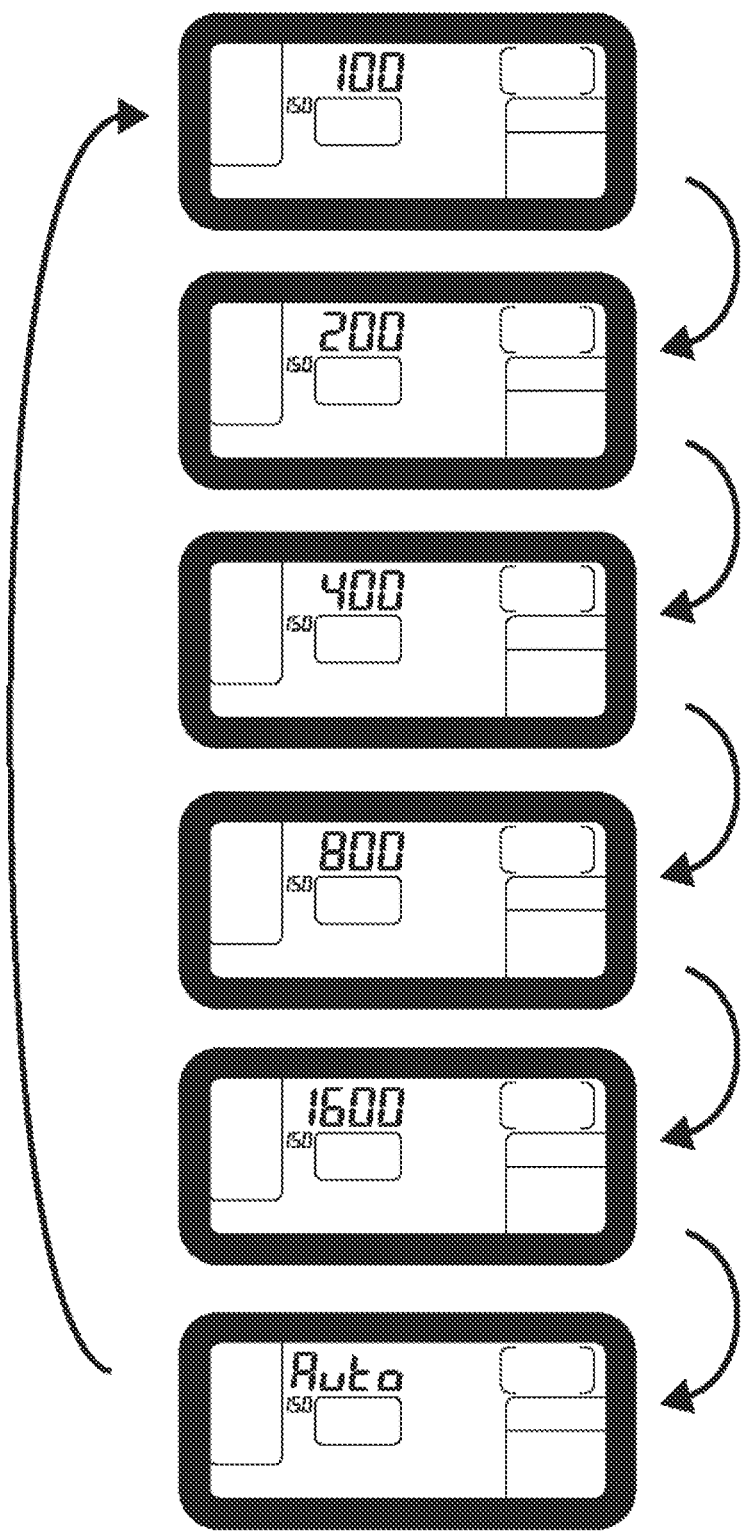
FIG. 2 illustrates an ISO sensitivity setting screen in the first and second exemplary embodiments.

A user can set an ISO sensitivity for capturing an image by operating the ISO sensitivity selection button and the dial member of the operation unit 70. FIG. 2 illustrates how the ISO sensitivity is set. The ISO sensitivity is sequentially selectable in the range of 100 to 1600 by rotating the dial member of the operation unit 70. The automatic ISO sensitivity setting can also be selected. The AGC circuit 15 changes a gain based on the ISO sensitivity set as described above.

FIG. 3 is a flow chart illustrating an operation in the automatic ISO sensitivity setting. In step S301, the system control circuit 50 determines whether automatic image correction processing is disabled or enabled. The user can select on/off of the automatic image correction processing using the operation unit 70.

If the automatic image correction processing is disabled (Yes in step S301), then in step S302, the system control circuit 50 sets ISO_MAX which is a maximum value of the ISO sensitivity in the automatic ISO sensitivity setting mode to ISO_MAX_1, and sets ISO_MIN which is a minimum value of the ISO sensitivity in the automatic ISO sensitivity setting mode to ISO_MIN_1. In this example, it is assumed that the ISO_MAX_1 and the ISO_MIN_1 are set to the ISO sensitivities 800 and 200, respectively. This combination of the maximum value and the minimum value will be referred to as a first selectable range.

If the automatic image correction processing is enabled (No in step S301), then in step S303, the system control circuit 50 sets the ISO_MAX to ISO_MAX_2 and sets the ISO_MIN to ISO_MIN_2. In this example, it is assumed that the ISO_MAX_2 and the ISO_MIN_2 are set to the ISO sensitivities 400 and 100, respectively. This combination of the maximum value and the minimum value will be referred to as a second selectable range.

While examples of setting the maximum and minimum values of the ISO sensitivity will be described, the present invention is not limited to such examples. In addition to the maximum and minimum values, a standard ISO sensitivity may also be set differently to the selectable ranges. Alternatively, the standard ISO sensitivity alone may be changed, without changing the maximum and minimum values. For example, in step S302, the standard ISO sensitivity may be set to 200 and the ISO_MIN may be set to 100. Further, in step S303, the standard ISO sensitivity may be set to 100 equal to the ISO_MIN.

FIG. 4A to 4C illustrate setting examples of the above described maximum and minimum values of the ISO sensitivity and the standard ISO sensitivity. More specifically, FIG. 4A illustrates an example that the selectable range of the ISO sensitivity of when the automatic image correction processing mode is enabled is set narrower than that of when the automatic image correction processing mode is disabled. FIG. 4B illustrates an example that the standard ISO sensitivity of when the automatic image correction processing mode is enabled is set lower than that of when the automatic image correction processing mode is disabled. FIG. 4C illustrates an example that both the selectable ranges of the ISO sensitivity and the standard ISO sensitivity are changed when the automatic image correction processing mode is enabled from those of when the automatic image correction processing mode is disabled.

In step S304, if it is detected that the SW1 is turned on (YES in step S304), then in step S305, the system control circuit 50 determines a combination of a shutter speed (TV) and an aperture value (AV) for appropriate exposure, based on a brightness value (BV) of an object obtained by the light metering unit 46. If a digital camera is not equipped with the shutter 12, instead of the shutter speed, charge accumulation time (TV) of the image sensor 13 is used.

The system control circuit 50 may be configured to fix the shutter speed at a user-specified value to control the aperture value in the shutter speed priority photographing mode and to fix the aperture value at a user-specified value to control the shutter speed in an aperture priority photographing mode. The combination of the shutter speed and the aperture value can be obtained by apex calculation and determined by an equation EV=BV+SV=TV+AV, in which SV corresponds to the ISO sensitivity.

In this example, it is assumed that the standard ISO sensitivity 100 is preferentially selected when the automatic ISO sensitivity setting is selected. The standard ISO sensitivity is not merely limited to 100, and other values may be set. The standard ISO sensitivity may be changed depending on the photographing mode. For example, the standard ISO sensitivity may be set to 100 in the portrait mode and 400 in the sports mode. Further, a method for calculating an exposure control value in the present exemplary embodiment is merely an example, and therefore, the present invention is not limited to such example.

In step S306, the system control circuit 50 checks the determined shutter speed and aperture value. If the exposure is less than an appropriate level (UNDER in step S306), in other words, if the shutter speed exceeds its low-speed control range or if the aperture value exceeds its full aperture value control range, the operation proceeds to step S307. The low-speed shutter speed control range may be set to equal to a configurable range (30 seconds for example) or to a speed at which camera shake is easily caused (1/focal length for example). In step S307, the system control circuit 50 changes the ISO sensitivity from the standard ISO sensitivity to compensate underexposure and accordingly changes the gain of the AGC circuit 15.

Next, in step S308, the system control circuit 50 determines whether the changed ISO sensitivity exceeds the ISO_MAX which is the ISO sensitivity maximum value set in step S302 or S303. If the changed ISO sensitivity exceeds the maximum value (YES in step S308), then in step S309, the system control circuit 50 sets the ISO sensitivity to the ISO_MAX and accordingly changes the gain of the AGC circuit 15. In step S310, the system control circuit 50 causes the display unit 54 to display a warning message that the shutter speed or the aperture value has reached its limit and an appropriate exposure cannot be obtained. The display unit 54 may be configured to blink a display of the shutter speed or the aperture value, for example. Next, the operation proceeds to step S315.

In step S306, if the exposure is determined to be greater than the appropriate level (OVER in step S306), in step S311, the system control circuit 50 changes the ISO sensitivity from the standard ISO sensitivity to obtain an appropriate exposure and accordingly changes the gain of the AGC circuit 15. Next, in step S312, the system control circuit 50 determines whether the changed ISO sensitivity is less than the ISO_MIN which is the ISO sensitivity minimum value set in step S302 or S303. If the ISO sensitivity is lower than the minimum value (Yes in step S312), in step S313, the system control circuit 50 sets the ISO sensitivity to the ISO_MIN and accordingly changes the gain of the AGC circuit 15. In step S314, the system control circuit 50 causes the display unit 54 to display a warning message similar to the warning message in step S310. When the standard ISO sensitivity is set 100 equal to the ISO sensitivity minimum value and it is determined overexposure in step S306, the system control circuit 50 immediately causes the display unit 54 to display a high-luminance warning, and the operation proceeds to step S315.

In step S306, if the exposure is determined as appropriate (APPROPRIATE in step S306), the system control circuit 50 does not change the ISO sensitivity and maintains the standard ISO sensitivity as it is, and the operation proceeds to step S315.

In the present exemplary embodiment, the system control circuit 50 changes the ISO sensitivity based on whether the exposure is at an appropriate level. However, alternatively, the ISO sensitivity may be changed based on whether the shutter speed is lower than a camera shake speed or based on a high-speed shutter speed such as 1/500 second in a sports mode.

In step S315, when the system control circuit 50 detects that the shutter switch SW2 is turned on (YES in step S315), then in step S316, the system control circuit 50 executes exposure processing and development processing. Next, in step S317, the system control circuit 50 determines whether the automatic image correction processing is disabled or enabled. Using the operation unit 70, the user can select on/off of correction of decrease in marginal illumination.

If the automatic image correction processing is disabled (No in step S317), the system control circuit 50 stores the developed image in a memory and ends the operation of the flow chart. If the automatic image correction processing is enabled (Yes in step S317), in step S318, the system control circuit 50 causes the image processing circuit 20 to execute the automatic image correction processing on the developed image. Then, the system control circuit 50 stores the processed image in the memory and ends the operation of the flow chart.

Next, the automatic image correction will be described.

As examples of the automatic image correction processing, correction of decrease in marginal illumination of an imaging optical system (lens) and correction of brightness of a dark part by determining brightness of a facial part in a captured image will be described with reference to the flow chart of FIG. 5.

Figure 5:
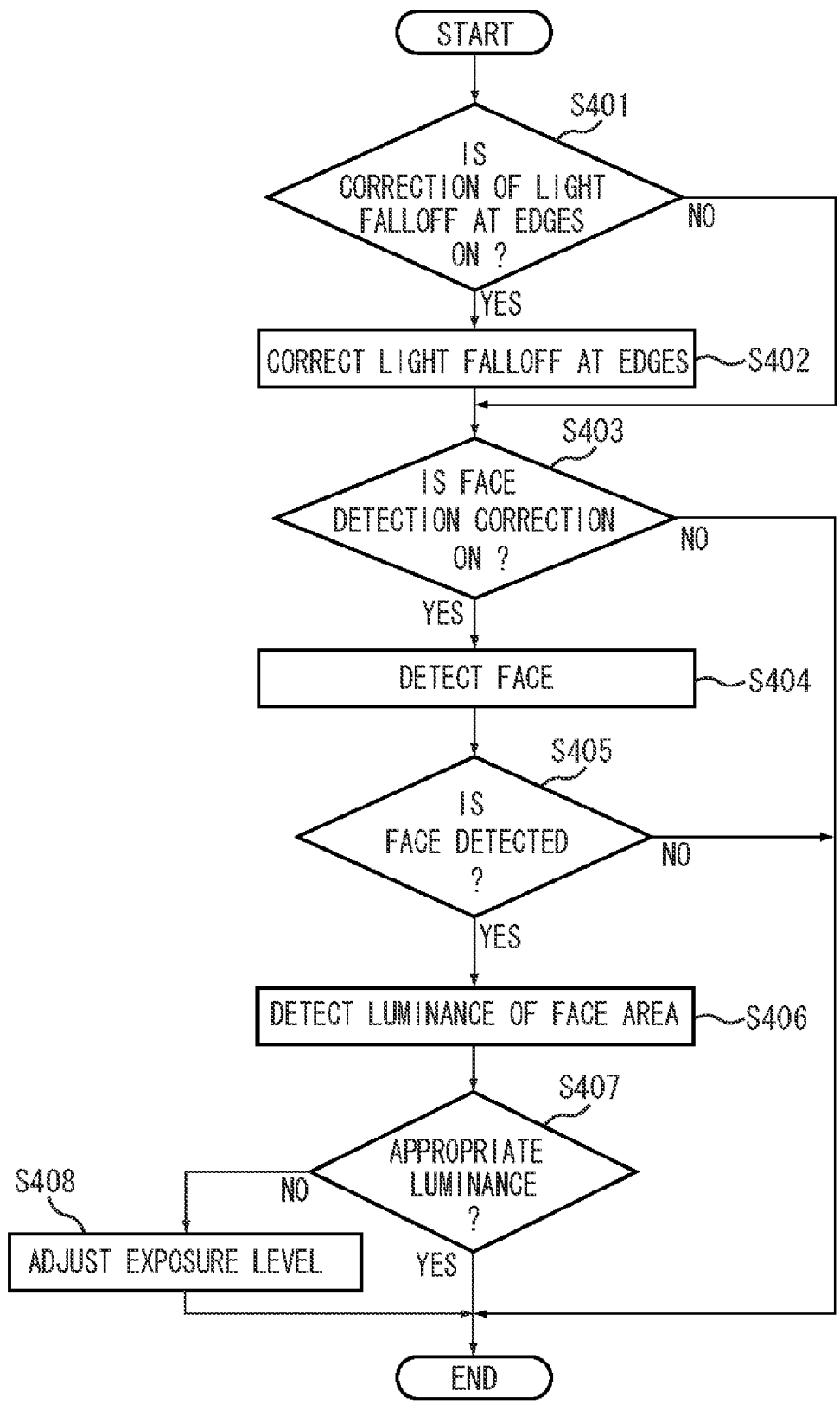
FIG. 5 is a flow chart illustrating an operation of a correction of decrease in marginal illumination of a lens and an operation of a correction of face luminance in the first and second exemplary embodiments.

When the automatic image correction processing is started in step S318 in FIG. 3, the system control circuit 50 determines whether the correction of decrease in marginal illumination is disabled or enabled as the automatic image correction in step S401 in FIG. 5.

In step S401, if the system control circuit 50 determines that the correction of decrease in marginal illumination is disabled (NO in step S401), the operation proceeds to step S403. If it is enabled (YES in step S401), the operation proceeds to step S402.

In step S402, the system control circuit 50 causes the image processing circuit 20 to correct the decrease in marginal illumination of the captured image. More specifically, the image processing circuit 20 acquires information about a decrease in marginal illumination from the lens unit 300 via the interface 120 and executes the correction based on the information. Next, the operation proceeds to step S403.

Examples of the information about the decrease in marginal illumination include a zoom position, an aperture value, and a pupil position. The decrease in marginal illumination is a decrease of the light quantity in an image area, which is caused if an incident angle becomes large with respect to an optical axis of a lens, even when an area having a uniform luminance is captured.

Figure 6:
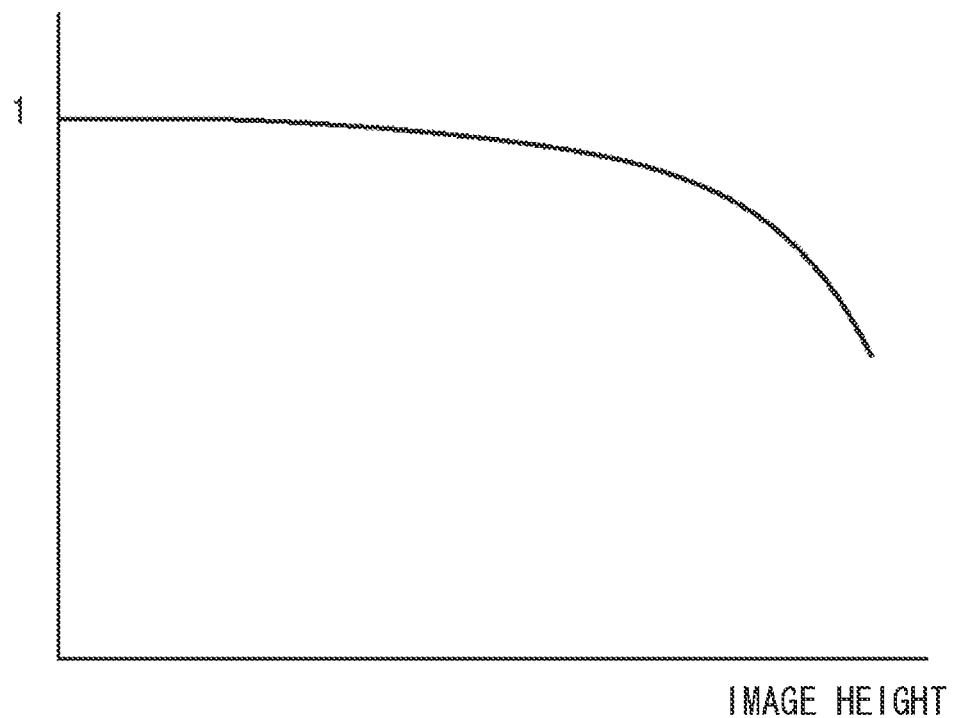
FIG. 6 is a conceptual diagram illustrating a decrease in marginal illumination of a lens in the first and second exemplary embodiments.

A correction method is not particularly limited. For example, as shown in FIG. 6, a ratio of an marginality light quantity to an center light quantity may be calculated with respect to an image height in advance by using an optical simulation tool or the like, and a marginal illumination coefficient corresponding to each pixel of the image sensor may be stored in the memory 52 in advance, so that, according to pupil distance information or the like acquired from the lens unit 300, the image processing circuit 20 corrects the marginal illumination coefficient, calculates the ratio of the marginality light quantity to the center light quantity, and amplifies the image signal according to the ratio.

Next, in step S403, the system control circuit 50 determines whether face detection correction is disabled or enabled as the automatic image correction. By using the operation unit 70, the user can select on/off of the face detection correction.

In step S403, if the system control circuit 50 determines that the face detection correction is disabled (NO in step S403), the system control circuit 50 ends the operation of the flow chart. If it is enabled (Yes in step S403), the operation proceeds to step S404. In step S404, the system control circuit 50 causes the face detection unit 21 to detect whether the captured image includes a human face. As described above, various methods may be used to detect a face. For example, the detection may be made by extracting skin-color data from the image data and extracting the area which is determined to be a skin-color area as a face area. Alternatively, a method for focusing on facial parts such as eyes, a nose, and a mouth, or a method for focusing on a face line and using information concerning an elliptical shape of the face line may be used to detection.

In step S405, if no face area is detected (NO in step S405), the system control circuit 50 ends the operation of the flow chart. Otherwise, the operation proceeds to step S406.

If a face is detected (Yes in step S405), in step S406, the system control circuit 50 causes the image processing circuit 20 to measure luminance of the detected face area. Then in step S407, whether the measured luminance is at an appropriate level or not is determined.

In this example, an average of luminance of the face area is calculated based on the captured image. Additionally, theoretical luminance of the area (luminance of the image with an appropriate exposure calculated by the light metering unit 46 and the system control circuit 50) is calculated, and a difference between the theoretical luminance and luminance of an actually captured image is determined.

If the luminance of the face area is not at the appropriate level (No in step S407), then in step S408, the image processing circuit 20 executes level correction processing and gamma correction processing, to adjust the exposure level by amplifying or attenuating the image signal of the face area.

In this processing, the exposure level of only a part of the image or the entire image may be adjusted.

In the present exemplary embodiment, the correction of luminance of a main object and the correction of the decrease in marginal illumination of a lens have been described as two examples of the automatic image correction processing. Further, examples in which the selectable range of the automatic ISO sensitivity setting is changed when the image correction processing is enabled have been described. However, in these types of correction processing, since a signal from a part of the image is amplified, noise contained in the part is accordingly amplified. Thus, by setting the maximum value of the ISO sensitivity of the automatic ISO sensitivity setting mode low in advance, it is possible to reduce a number of unsuccessful photographs which include an unnecessarily deteriorated SNR and too much noise caused by the image correction processing.

Addition to the above two types of image correction processing, other types of image correction processing such as correction of image luminance or contrast can provide similar effects, as long as the processing includes amplification of an image data signal. Further, if a plurality of automatic image correction functions is provided, the selectable range of the ISO sensitivity or the standard ISO sensitivity may be changed only when the luminance or the contrast is corrected, and the selectable range of the ISO sensitivity may not be changed when the correction does not include amplification of an image signal. Examples of the correction that does not include amplification of an image signal include red-eye correction and lens distortion correction.

Figure 7:
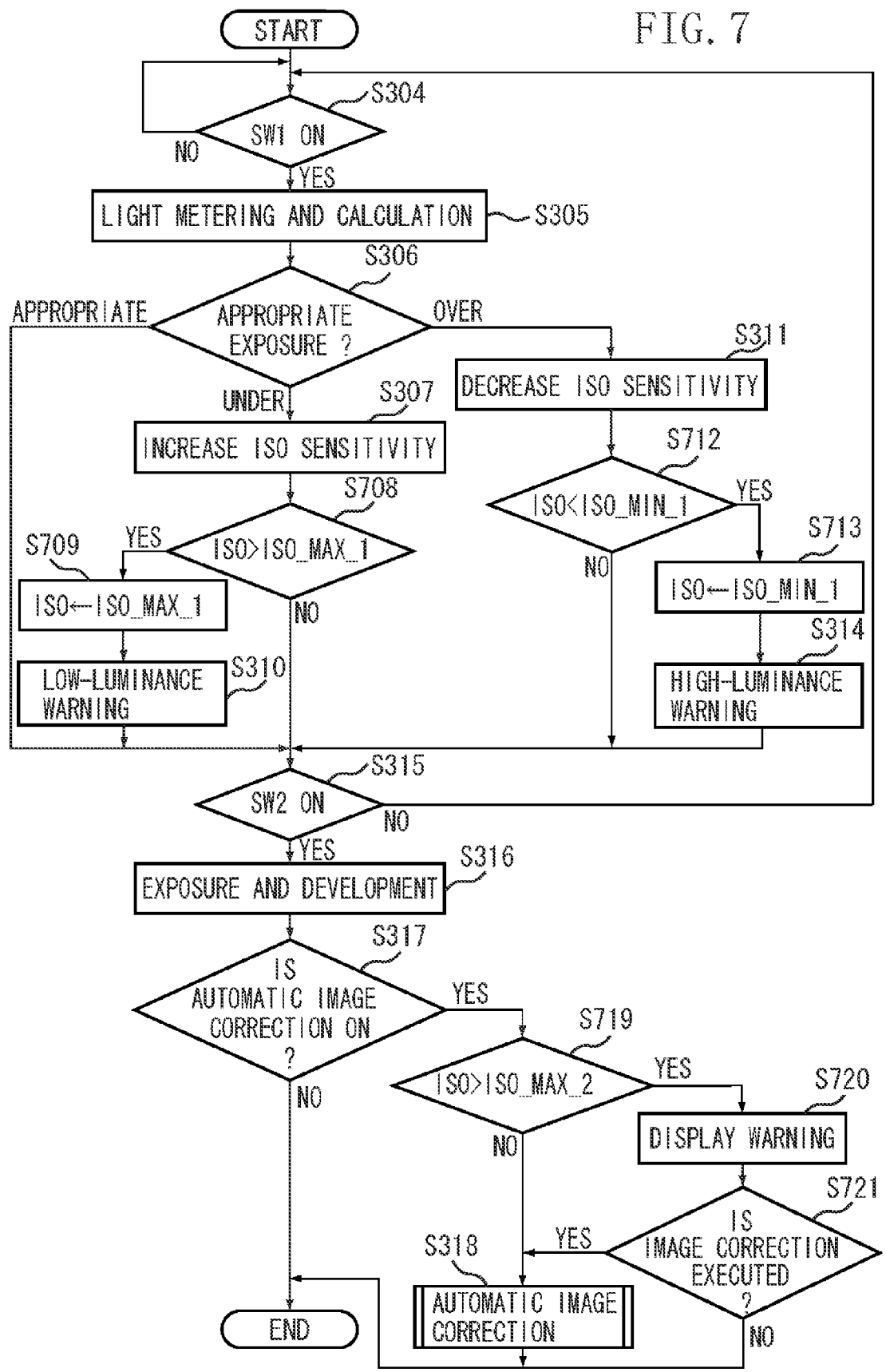
FIG. 7 is a flow chart illustrating a warning operation executed when an ISO sensitivity higher than a predetermined ISO sensitivity is selected in an automatic image correction processing in the second exemplary embodiment.

When the automatic image correction processing is executed during the automatic ISO sensitivity setting, a warning depending on the selected ISO sensitivity is displayed after an image is captured. Such warning display operation will be described with reference to the flow chart of FIG. 7. In the flow chart of FIG. 7, the steps similar to those in the flow chart of FIG. 3 are denoted with the same numbers.

In a second exemplary embodiment, until completion of the exposure processing, it is assumed that ISO_MAX_1 is set to the ISO_MAX which is the maximum value of the ISO sensitivity in the automatic ISO sensitivity setting mode, and ISO_MIN_1 is set to the ISO_MIN which is the minimum value of the ISO sensitivity in the automatic ISO sensitivity setting mode. Thus, the steps S301 to S303 of FIG. 3 are skipped and the operation proceeds to step S304.

In step S304, if the system control circuit 50 detects that the SW1 is turned on (YES in step S304), then in step S305, the system control circuit 50 sets the standard ISO sensitivity and determines a combination of the shutter speed (TV) and the aperture value (AV) for an appropriate exposure.

In step S306, the system control circuit 50 checks the determined shutter speed and aperture value. If the exposure is less than an appropriate level (UNDER in step S306), then in step S307, the system control circuit 50 changes the ISO sensitivity from the standard ISO sensitivity to compensate underexposure.

Next, in step S708, the system control circuit 50 determines whether the changed ISO sensitivity exceeds the ISO_MAX_1 which is the ISO sensitivity maximum value. If the changed ISO sensitivity exceeds the maximum value (Yes in step S708), then in step S709, the system control circuit 50 sets the ISO sensitivity to the ISO_MAX_1. In step S310, the system control circuit 50 causes the display unit 54 to display a low-luminance warning. The operation then proceeds to step S315.

In step S306, if the exposure is determined to be greater than the appropriate exposure level (OVER in step S306), then in step S311, the system control circuit 50 changes the ISO sensitivity from the standard ISO sensitivity to obtain an appropriate exposure.

Next, in step S712, the system control circuit 50 determines whether the changed ISO sensitivity is less than the ISO_MIN_1 which is the set ISO sensitivity minimum value. If the ISO sensitivity is lower than the ISO_MIN_1 (Yes in step 5712), then in step S713, the system control circuit 50 sets the ISO sensitivity to the ISO_MIN_1. In step S314, the system control circuit 50 causes the display unit 54 to display a warning.

If the standard ISO sensitivity is set to 100 which is the minimum value of the selectable range of the ISO sensitivity and it is determined as overexposure in step S306, then the system control circuit 50 immediately causes the display unit 54 to display the high-luminance warning, and the operation proceeds to step S315.

In step S306, if the exposure is determined as appropriate (APPROPRIATE in step S306), the system control circuit 50 does not change the ISO sensitivity and maintains the standard ISO sensitivity as it is. The operation then proceeds to step S315.

In step S315, when the system control circuit 50 detects that the shutter switch SW2 is turned on (YES in step S315), then in step S316, the system control circuit 50 executes the exposure processing and the development processing. Next, in step S317, the system control circuit 50 determines whether the automatic image correction processing is disabled or enabled. If the automatic image correction processing is disabled (No in step S317), the system control circuit 50 stores the developed image and ends the operation of the flow chart.

If the automatic image correction processing is enabled (Yes in step S317), the operation proceeds to step S719. In step S719, if the set ISO sensitivity of the captured image is less than a predetermined ISO sensitivity (No in step S719), then in step S718, the system control circuit 50 executes the above described automatic image correction processing. On the other hand, if the set ISO sensitivity of the captured image is greater than a predetermined ISO sensitivity (Yes in step S719), then in step S720, the system control circuit 50 causes the display unit 54 to display a warning.

In this example, it is assumed that ISO_MAX_2 (ISO sensitivity 400) which is the maximum value of the second selectable range is used as the predetermined ISO sensitivity. For example, when an image is captured with ISO sensitivity 800 in the automatic ISO sensitivity setting, a warning is displayed. Such warning may be displayed on units other than the display unit 54. A warning may be superimposed on an image of the image display unit 28. Alternatively, sound may be used as the warning.

Thus, when the automatic image correction processing is executed and an ISO sensitivity higher than the predetermined ISO sensitivity is selected in the photographing, the system control circuit 50 causes the display unit 54 to display a warning message that image quality of the captured image may be decreased. Together with the warning message, the system control circuit 50 causes the display unit 54 to display an inquiry for the user about whether to execute the automatic image correction processing.

In step S721, the system control circuit 50 determines whether the user has issued an instruction to execute the automatic image correction processing using the operation unit 70. If the user has issued the instruction to execute the automatic image correction processing (Yes in step S721), then in step S318, the system control circuit 50 executes the above described automatic image correction processing. If the user has not issued the instruction (No in step S721), the system control circuit 50 cancels execution of the automatic image correction processing and ends the operation of the flow chart.

In the first exemplary embodiment, when a warning is displayed before the SW2 is turned on, the user cannot be sure whether disabling the automatic image correction processing can cancel the warning display or not. Thus, in the present exemplary embodiment, until a start of the imaging processing, the system control circuit 50 consistently sets the selectable range of the ISO sensitivity to the first selectable range, regardless of the execution of the automatic image correction processing.

When the automatic image correction processing is to be executed on the captured image, and if the ISO sensitivity of the captured image exceeds the second selectable range which would deteriorate the SNR of the captured image because of the automatic image correction processing, the system control circuit 50 issues an instruction to display a warning. In this way, when disabling the automatic image correction processing prevents the SNR from falling below a predetermined level, the user can be allowed to determine whether to execute the automatic image correction processing.

In the second exemplary embodiment, the system control circuit 50 determines whether the ISO sensitivity of the captured image is within the second selectable range in step S719 and then executes the automatic image correction in step S318. However, the present invention is not limited to such configuration.

When the face detection correction alone is set as the automatic image correction processing executed by the image processing circuit 20 and the automatic image correction processing is enabled, if no face area is detected from the captured image, correction deteriorating the SNR of the image is not executed. Thus, if the face detection correction alone is set as the automatic image correction processing executed by the image processing circuit 20, prior to step S719, the system control circuit 50 determines whether the face detection unit 21 can detect the face area from the captured image. It may be configured so that if the system control circuit 50 determines that the face detection unit 21 detects the face area from the captured image, the operation proceeds to step S719, and that if not, since no area to be corrected is present, the system control circuit 50 ends the operation of the flow chart.

The above exemplary embodiments have been described using a single-lens reflex digital camera as an example. However, the present invention is also applicable to other types of cameras as long as the camera has an automatic image correction processing function as described above. For example, the present invention can be applied to compact digital cameras and digital video cameras that are not equipped with the mirror 130 and the shutter 12 and a monitoring camera system connected to a computer which includes a camera and automatic image correction processing functions.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2008-251687 filed Sep. 29, 2008 and No. 2009-186155 filed Aug. 10, 2009, which are hereby incorporated by reference herein in their entirety.

What is claimed is:

1. An imaging apparatus comprising:
an image sensor configured to capture an object image;
a selection unit configured to automatically select a sensitivity of the image sensor from a predetermined selectable range; and
an image processing unit configured to execute correction processing for correcting a decrease in marginal illumination based on a lens used when capturing the object image in which a signal of a part of an image captured by the image sensor which has the sensitivity selected by the selection unit is amplified,
wherein, when the image processing unit performs correction processing for correcting the decrease in marginal illumination based on the lens, the selection unit sets an upper limit of the selectable range lower, compared with the upper limit thereof when the image processing unit performs correction processing for correcting distortion based on the lens.

2. The imaging apparatus according to claim 1, wherein, when the image processing unit performs the correction processing for correcting the decrease in marginal illumination based on the lens, the selection unit sets the selectable range narrower, compared with the selectable range when the image processing unit performs the correction processing for correcting distortion based on the lens.

3. The imaging apparatus according to claim 1, wherein the correction processing is a correction of luminance of a part of captured image.

4. The imaging apparatus according to claim 1, wherein the correction processing is a correction of decrease in marginal illumination executed on image data output from the image sensor based on information about marginal illumination of an imaging optical system.

5. The imaging apparatus according to claim 1 further comprising a face detection unit configured to detect a human face area from image data output from the image sensor,
wherein the image processing unit corrects the face area of the image data to set luminance of the face area to be at an appropriate level.

6. An imaging apparatus comprising:
an image sensor configured to capture an object image;
a selection unit configured to automatically select a sensitivity of the image sensor from a first selectable range;
an image processing unit configured to execute correction processing based on the lens used when capturing the object image in which a signal of a part of an image captured by the image sensor which has the sensitivity selected by the selection unit is amplified; and
a warning unit configured to issue a warning when the image processing unit performs correction processing for correcting a decrease in marginal illumination based on the lens and the sensitivity selected by the selection unit exceeds an upper limit of a second selectable range, which is set lower than an upper limit of the first selectable range.

7. A method for capturing an image comprising:
automatically selecting a sensitivity of an image sensor configured to capture an object image from a predetermined selectable range; and
executing correction processing to correct a decrease in marginal illumination based on a lens used when capturing the object image in which a signal of a part of an image captured by the image sensor which has the selected sensitivity is amplified,
wherein, when the selection is made and the correction processing is performed to correct the decrease in marginal illumination based on the lens, an upper limit of the selectable range is set lower, compared with the upper limit thereof when correction processing for correcting distortion based on the lens is performed.

8. A method for capturing an image comprising:
automatically selecting a sensitivity of an image sensor configured to capture an object image from a first selectable range;
executing correction processing for correcting a decrease in marginal illumination based on a lens used when capturing the object image in which a signal of a part of an image captured by the image sensor which has the selected sensitivity is amplified; and
giving a warning when the correction processing for correcting the decrease in marginal illumination based on the lens in performed and the selected sensitivity exceeds an upper limit of a second selectable range, the upper limit of which is set lower than an upper limit of the first selectable range when correction processing for correcting distortion based on the lens is performed.

* * * * *